United States Patent
Henskes et al.

(10) Patent No.: US 10,091,982 B2
(45) Date of Patent: Oct. 9, 2018

(54) SYSTEM FOR DETERRING BIRDS

(71) Applicant: BIRD CONTROL GROUP B.V., Delft (NL)

(72) Inventors: Steinar Finn Boye Henskes, Delft (NL); Pim Roelof Clement Tammes, Delft (NL); Tim Sprang, Delft (NL); Pepijn Bastiaan Cox, Delft (NL)

(73) Assignee: Bird Control Group B.V., Delft (NL)

( * ) Notice: Subject to any disclaimer, the term of this patent is extended or adjusted under 35 U.S.C. 154(b) by 158 days.

(21) Appl. No.: 15/105,854

(22) PCT Filed: Dec. 19, 2013

(86) PCT No.: PCT/NL2013/050928
§ 371 (c)(1),
(2) Date: Jun. 17, 2016

(87) PCT Pub. No.: WO2015/093938
PCT Pub. Date: Jun. 25, 2015

(65) Prior Publication Data
US 2017/0027156 A1 Feb. 2, 2017

(51) Int. Cl.
*A01M 29/10* (2011.01)
*A01M 31/00* (2006.01)
(Continued)

(52) U.S. Cl.
CPC .......... *A01M 29/10* (2013.01); *A01M 31/002* (2013.01); *F21V 14/02* (2013.01); *F21V 21/15* (2013.01)

(58) Field of Classification Search
CPC .............................. A01M 29/10; A01M 31/002
(Continued)

(56) References Cited

U.S. PATENT DOCUMENTS 6,508,204 B1 * 1/2003 Matheson ............. A01M 29/10
  119/713
6,575,597 B1 * 6/2003 Cramer ............... F21V 33/0064
  116/22 A (Continued)

FOREIGN PATENT DOCUMENTS

JP      2002000162       1/2002

OTHER PUBLICATIONS

PCT, International Search Report and Written Opinion, International Application No. PCT/NL2013/050928, Aug. 5, 2014 (11 pages).

*Primary Examiner* — Yvonne R Abbott-Lewis
(74) *Attorney, Agent, or Firm* — Baker & Hostetler LLP (57) ABSTRACT

According to an aspect of the present application, a bird deterrence system is proposed comprising a laser device for producing a laser beam; comprising scanning equipment for rotating the laser beam at designated lateral and elevational angular speeds relative to the normal axis; a power supply for feeding the laser device and the scanning equipment; and a control unit for controlling the laser device and scanning equipment. An input module is programmed, in a teach mode, to control the scanning equipment by rotating the laser beam at designated lateral and elevational angles, wherein the input module further comprises an identification routine to identify said designated lateral and elevational angles as waypoints for said successive waypoints defining a laser scanning area; and to store the waypoints in the control unit, and wherein the input module further comprises a routine for defining a maximum elevational angle; and wherein the control unit is programmed to de-activate the laser beam for elevational angles larger than the maximum designated elevational angle.

10 Claims, 6 Drawing Sheets

(51) Int. Cl.
*F21V 14/02* (2006.01)
*F21V 21/15* (2006.01)

(58) Field of Classification Search
USPC ............................... 119/22 A, 713, 712, 903
See application file for complete search history.

(56) References Cited

U.S. PATENT DOCUMENTS

| | | | |
|---|---|---|---|
| 6,681,714 B1 | 1/2004 | Johnson | |
| 7,506,815 B2 * | 3/2009 | Spiegel | A01M 29/10 |
| | | | 119/713 |
| 8,816,863 B2 * | 8/2014 | Arman | 116/22 A |
| 2003/0101633 A1 * | 6/2003 | Bhullar | A01M 1/226 |
| | | | 43/1 |
| 2010/0201525 A1 * | 8/2010 | Bahat | A01M 29/10 |
| | | | 340/573.2 |
| 2011/0144829 A1 | 6/2011 | Kim et al. | |
| 2013/0257641 A1 * | 10/2013 | Ronning | G01S 13/42 |
| | | | 342/54 |
| 2016/0128315 A1 * | 5/2016 | Henskes | A01M 29/10 |
| | | | 119/713 |
| 2018/0015492 A1 * | 1/2018 | Morris | A01M 1/026 |

* cited by examiner

SYSTEM FOR DETERRING BIRDS

FIELD OF THE INVENTION

The present invention relates to a deterring method and device for deterring birds from an area to be protected in particular, for preventing birds to hinder air traffic or to consume gardens fields or crops.

BACKGROUND OF THE INVENTION

Preventing collisions between birds and aircraft poses major challenges for airports. To combat this problem, various techniques are proposed: distress calls, bangs, mirrors and laser beams. Laser beams may be used by bird control staff using a manual operated laser torch but also using a system which automatically moves a laser beam in certain area. The use of laser beams can be effective in reducing the risk of collisions between birds and aircraft, but also introduces a new risk: the risk of shining the laser beam into the cockpit of the aircraft or on airport staff thereby blinding the pilots and staff. In order to safely make the use of laser beams in an airport environment US20110144829 provides an unmanned, semi-autonomous mobile robot that operates in airport surroundings. The robot is programmed to operate a laser device that has a safety control system. The laser automatically stops when an irradiation angle of the laser is at a reference angle or more. The reference angle may be determined to be an angle that prevents interference with the sight of a pilot caused by a high irradiation of the laser for the bird repellent. The system is dependent on detailed topography recognition for execution the unmanned robot. A problem associated with the prior art based deterrence systems is that the control and management is complex and error prone. For instance, the system will stop functioning, when a communication error occurs. Another prior art system is disclosed in US6681714. This system provides for sectorwise scanning with a light beam to disturb animals in their nocturnal nesting. A laser swath defines a lateral angle alpha to cover an area to be protected. Also, the laser swath may be placed at a certain pitch relative to its support surface to cover the subject area with focused light at a certain elevation beta. While it is known to cover certain sectors with scanning beam devices, it has been found that the effectiveness of the deterrence may still be improved. To this end, a new and improved scanning system is proposed, wherein the area of interest can be easily input, and wherein the scanning behavior of the laser beam significantly contributes in the deterrence of the animals.

SUMMARY OF THE INVENTION

According to an aspect of the present application, a bird deterrence system is proposed comprising a laser device for producing a laser beam; comprising scanning equipment for rotating the laser beam at designated lateral and elevational angular speeds relative to the normal axis; a power supply for feeding the laser device and the scanning equipment; and a control unit for controlling the laser device and scanning equipment; wherein the control unit comprises an input module that is programmed, in a teach mode, to control the scanning equipment by rotating the laser beam at designated lateral and elevational angles, wherein the input module further comprises an identification routine to identify said designated lateral and elevational angles as waypoints for said successive waypoints defining a laser scanning area; and to store the waypoints in the control unit, and wherein the input module further comprises a routine for defining a maximum elevational angle; and wherein the control unit is programmed to de-activate the laser beam for elevational angles larger than the maximum designated elevational angle.

Accordingly, the laser scanning area may be conveniently defined and adjusted to its practical surroundings.

In certain aspects of the invention, the control unit is programmed to execute the steps of
  receiving successive waypoints defining a laser scanning area to be scanned by the laser beam;
  defining a trajectory bounded between perimeter lines that connect successive waypoints inside the laser scanning area, the trajectory having a principal direction;
  transforming the trajectory in designated elevational and lateral angles of a laser beam to be rotated; and
  activating the laser beam to produce a moving spot along the trajectory for said designated elevational and lateral angles.

One advantage of this solution in contrast to prior art is that the effectiveness of the deterrence is significant. Also, by defining a trajectory of a predesigned form, perceived threat is greatly increased for the birds, which is unattainable by conventional sweeping of the beams.

In an embodiment the control unit is programmed to define a trajectory with reduced angular speed for increasing elevations or lateral angles, so as to produce a relative constant speed of the laser spot on the ground. In addition to effectiveness, directing the spot on the ground increases safety, since the beam does not need to be directly targeted above the ground. The moving spot on the ground forms an effective deterrence for birds, due to perceived realness/severity of approaching danger. To further increase a realistic threat perception, the control unit may be programmed to define a trajectory of the laser spot with a lateral spreading on the ground relative to the principal direction. The spreading simulates a lateral extent of the threat which effectively enhances deterrence. The control unit may be programmed to define successive trajectories of the laser spot having the same principal directions on the ground. By moving the spot in the same direction for successive trajectories, a simulation is provided which imposes a flight direction for the birds i.e. in the same principal direction. This may be effective to control the movement of birds in specific directions.

DETAILED DESCRIPTION

Unless otherwise defined, all terms (including technical and scientific terms) used herein have the same meaning as commonly understood by one of ordinary skill in the art to which this invention belongs as read in the context of the description and drawings. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some instances, detailed descriptions of well-known devices and methods may be omitted so as not to obscure the description of the present systems and methods. The term "lateral and elevational angular speeds" as mentioned in the application refer to a frame of reference having a normal axis (i.e. upstanding, along the gravity direction, relative to the area to be scanned. These frames of references are understood in their ordinary meaning; i.e. the elevational angle defines an angle of elevation relative to a plane defined by the area to be scanned, usually, having its normal direction coinciding with the direction of gravity, or, as the case may be, the normal direction of the area inclination. The elevation angle is also referred as tilt angle; obtained by tilt movement, e.g. by corresponding tilt motors or tilt mirrors. Similarly, the lateral angle is also referred as pan angle obtained by panning movement e.g. by tilt motors or tilt mirrors.

The lateral angle defines an angle relative to a forward direction in the plane defined by the area to be scanned, and has typically an extent in the + and − region, i.e. right and left relative to forward direction. Naturally, geometrical transforms of such frames of reference angular speeds are deemed included hereby. It will be further understood that the terms "comprises" and/or "comprising" specify the presence of stated features but do not preclude the presence or addition of one or more other features. All publications, patent applications, patents, and other references mentioned herein are incorporated by reference in their entirety. In case of conflict, the present specification, including definitions, will control.

The term laser scanning area is used to define an area generally defined by perimeter lines connecting successive waypoints and has no limiting mathematical connotation. It has to be understood in a sense, that connecting lines need not be perfect lines, and the area need not be exactly conforming the polygon provided by the waypoints. Merely it is indicated that the area can be defined by the waypoints.

By 'scanning' it is meant that a laser beam is moved in the area, in particular, by projecting a spot on the ground or a predetermined projection surface.

Throughout the application, any function for carrying out the disclosed methods, in particular, as further clarified below: a receiving function; defining function; transforming function; and activating function is implemented in hardware and/or software and as structurally identifiable by the function it performs in the system; i.e. the function is physically implemented in hardware and/or software or information structures transmitted through the network. The function may be implemented by dedicated processing circuitry that processes input data read from system resources. These functions may be executed by one or more processors configured to perform operational acts in accordance with the present systems and methods, such as to provide control signals to the various other module components. The processor may be a dedicated processor for performing in accordance with the present system or may be a general-purpose processor wherein only one of many functions operates for performing in accordance with the present system. The processor may operate utilizing a program portion, multiple program segments, or may be a hardware device utilizing a dedicated or multi-purpose integrated circuit. This also covers combinations of hardware and software, for example: a micro-controller sending a PWM signal to a motor driver to control a speed of the motor. Any type of processor may be used such as dedicated or shared one. The processor may include micro-controllers, central processing units (CPUs), digital signal processors (DSPs), ASICs, or any other processor(s) or controller(s) such as digital optical devices, or analog electrical circuits that perform the same functions, and employ electronic techniques and architecture. The controller or processor may further comprise a memory that may be part of or operationally coupled to the controller. The memory may be any suitable type of memory where data is stored. Any medium known or developed that can store and/or transmit information suitable for use with the present systems and methods may be used as a memory. The memory may also store user preferences and/or application data accessible by the controller for configuring it to perform operational acts in accordance with the present systems and methods.

The invention is described more fully hereinafter with reference to the accompanying drawings, in which embodiments of the invention are shown. This invention may, however, be embodied in many different forms and should not be construed as limited to the embodiments said forth herein. Rather, these embodiments are provided so that this disclosure will be thorough and complete, and will fully convey the scope of the invention to those skilled in the art. The description of the exemplary embodiments is intended to be read in connection with the accompanying drawings, which are to be considered part of the entire written description. In the drawings, the size and relative sizes of systems, components, layers, and regions may be exaggerated for clarity. Embodiments are described with reference to schematic illustrations of possibly idealized and/or intermediate structures of the invention.

Figure 1:
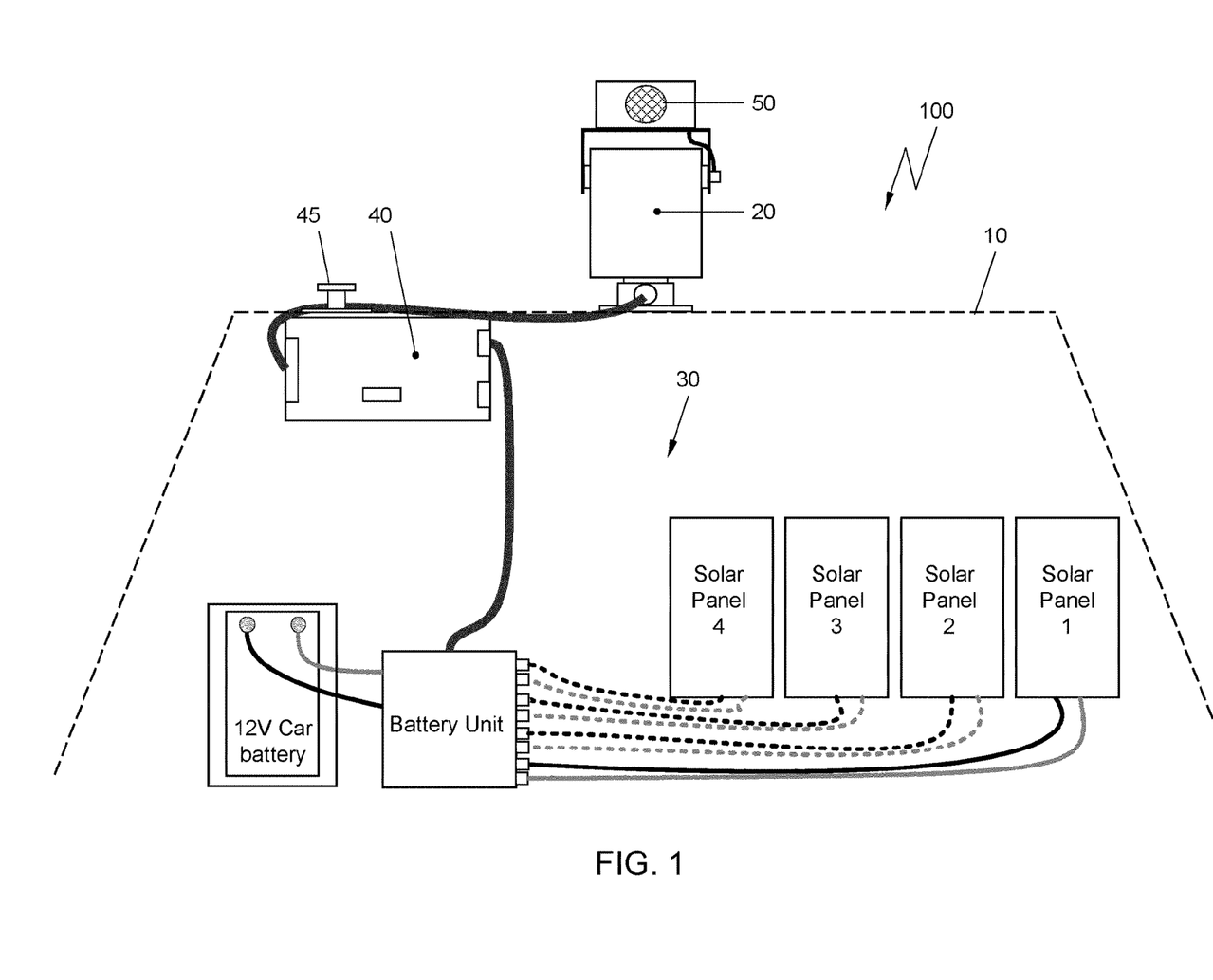
FIG. 1 shows a schematic arrangement of a bird deterrence system according to an embodiment of the invention.

FIG. 1 shows a further schematic arrangement of a bird deterrence system 100 according to an embodiment of the invention. A frame 10 is constructed to be fixed relative to an area to be scanned. The frame is typically a fixed construction, for example, placed on a support in a designated area, or fixed to a building; to provide for an accurate scanning of the area. The frame provides for the laser device 20 mounted, depending on specific dimensions, several decimeters or meters above the ground.

Figure 2:
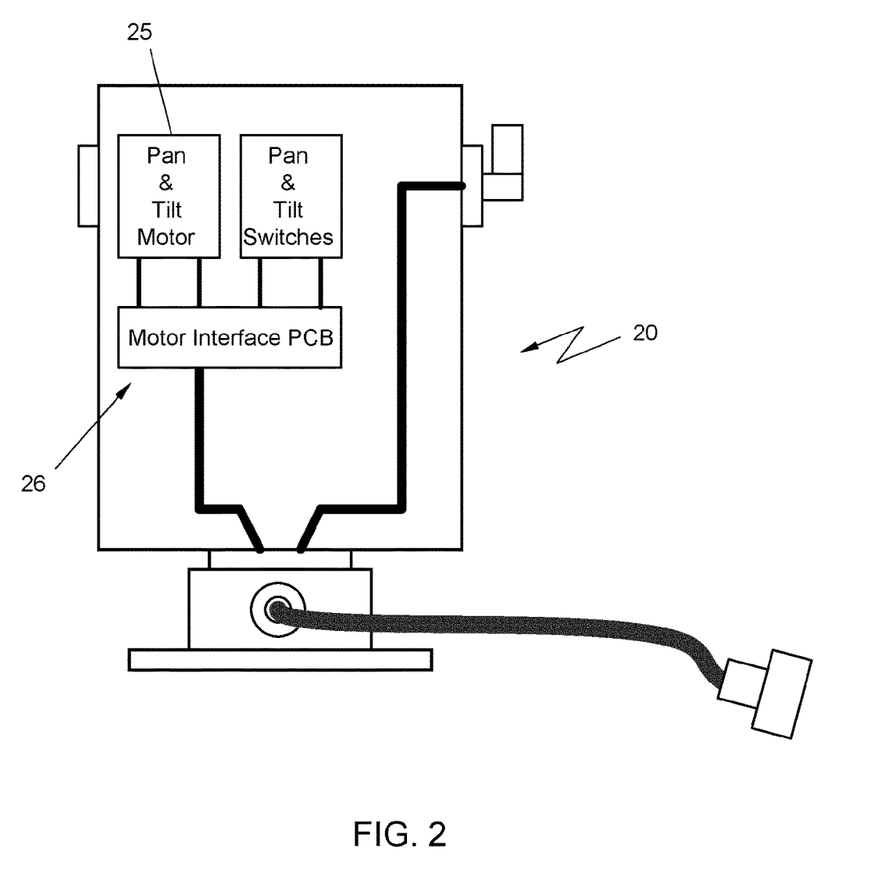
FIG. 2 shows a detailed view of scanning equipment to be mounted on the frame.

The laser device 50 can be rotated or tilted by scanning equipment 20, for rotating the laser beam at designated lateral and elevational angular speeds relative to the normal axis, further illustrated in FIG. 2.

Conveniently a power supply 30 is provided for feeding the laser device 50, scanning equipment 20, and control unit 40. The power supply is in the embodiment provided with a battery unit and solar panels, but naturally, also net power supply, wind turbine or fuel generator may be feasible.

In addition, a control unit 40 is attached to the frame that controls the laser device and scanning equipment and optionally the power supply. The control unit is provided with an emergency switch 45 to prevent hazard.

FIG. 2 shows a detailed view of a laser scanning equipment 20 to be mounted on the frame. In the practical embodiment beam direction control is easier operable by scanning equipment comprising pan and tilt motors arranged to direct the device in designated lateral and elevational angles; the pan and tilt motors 25 controlled by the control unit 40. Thus, the control unit 40 instructs pan and tilt motors 25 to rotate at predetermined angular speeds for providing panning and tilting movement. Angle control of the laser device 50 can be done or enhanced by additional sensors/hardware for higher accuracy. For example: motor/axis encoders (absolute, absolute multi-turn, binary) or a stepper motor.

The laser device 50 can accordingly be rotated, thereby rotating the laser beam at designated lateral and elevational angular speeds relative to the normal axis. Alternatively, the scanning equipment may be formed by a pan and tilt mirror may be provided to optically provide for the pan and tilt movement to rotate the laser beam at designated lateral and elevational angular speeds. Further, alternatively, the scanning equipment may be formed by a suitable grip for handheld applications.

The surface at an airport is not always perfectly flat or airport staff want to use the laser device 50 from a structure (the control tower). In both situations the maximum angle at which the laser beam is limited to shine in relation with the horizontal axis must be variable and controllable. Mechanical switches may provide for a single switching angle. This angle can be manipulated by installing the mechanical tilt switch in a tilted position. However if the device is turned over the horizontal axis, the manipulated switching angle is changed. For example: it is +5 degrees above the horizon in normal position. When the device is turned 180 degrees, this maximum angle is −5 degrees.

The scanning equipment may to this end be provided with g-sensor 26 that detects acceleration and inclination angles. The g-sensor may be part of an inertial measurement unit comprising any combination of an accelerometer (g-sensor), gyroscope, and/or magnetometer.

Bird control staff at airports also detect birds which are situated above the configured maximum angle. For example in trees. Therefore a possibility may be to temporarily deactivate the safety feature is desired. This can be accomplished by adding an extra "inactive" mode which can be selected by a switch. But in order to not have the user disable the safety feature permanently and still have a good user experience, an extra switch is introduced. When this button is pushed when the laser beam is on, the safety feature is disabled. When this button is released, the safety feature turns back on and the maximum angle is reestablished. In this way the user is aware of disabling the safety feature, without negatively effecting the user experience.

Figure 3:
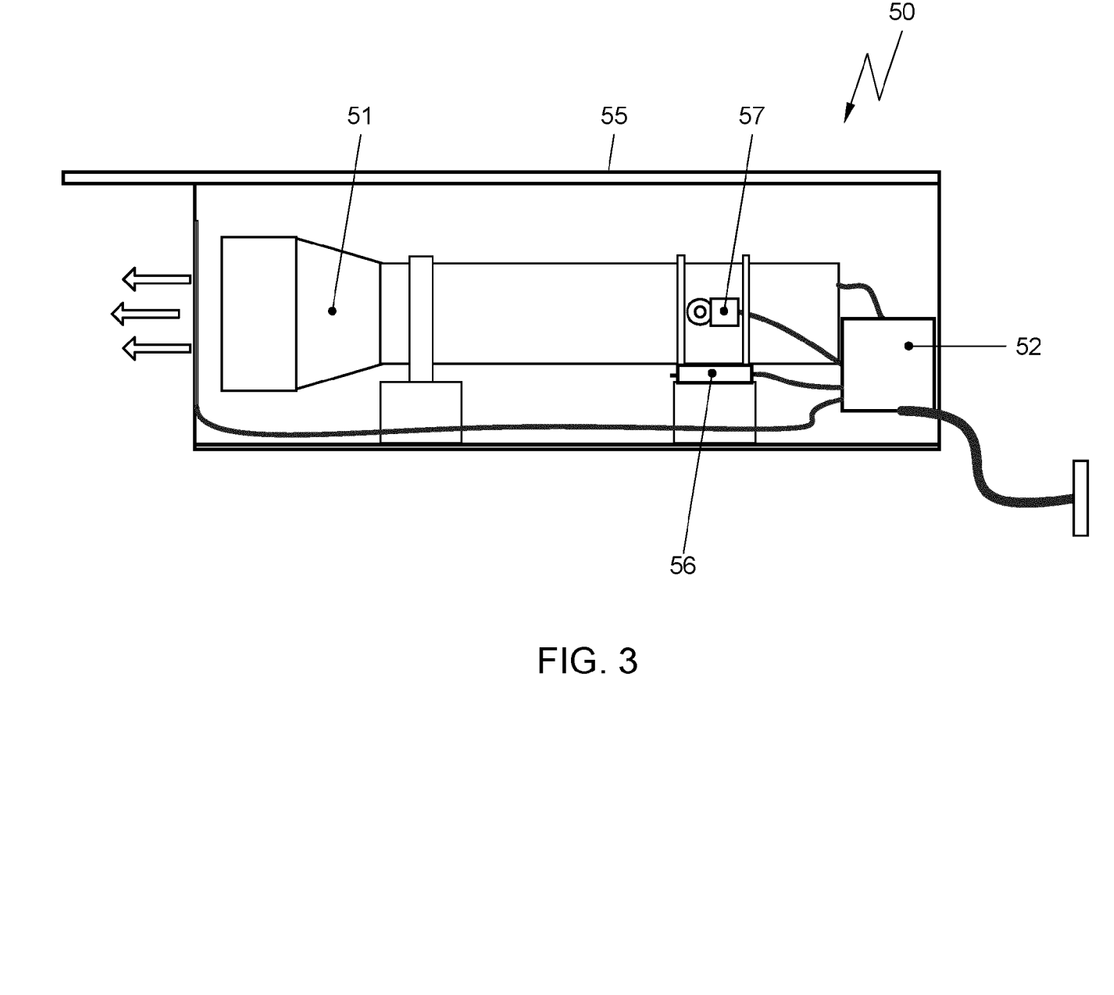
FIG. 3 shows an exemplary embodiment of the laser device.

FIG. 3 shows a schematic display of the laser device 50 to be mounted on the frame 10 via the scanning equipment 20. It may be a laser of suitable intensity, for example, depending on dimensioning, a 50 mW laser or an 800 mW laser. The laser 51 is provided in a housing 55 having means for maintaining an operating temperature, typically by heating and cooling by a Peltier elements 56, to keep the laser in a temperature range of +10 . . . +50 deg. Celsius. A NTC sensor 57 is provided for temperature measurement and feedback loop in the PCB 52. PCB 52 may additionally be provided with an inertial measurement unit (g-sensor).

In an embodiment a maximum elevational angle is defined by circuitry controlled in the control unit 40. Depending on a detected elevation angle (tilt) the control unit 40, with a possibility PCB 52 is programmed to de-activate the laser beam for elevational angles larger than the maximum designated elevational angle. Control unit 40 may be communicatively coupled with PCB 52 to store and/or monitor the detection angles. It is possible to have certain maximum angles as predefined settings. For example the following angles in relation to the horizontal axis: "−30", "−20", "−10", "−5", "0", "+5", "+10", "+20", "+30".

Figure 4:
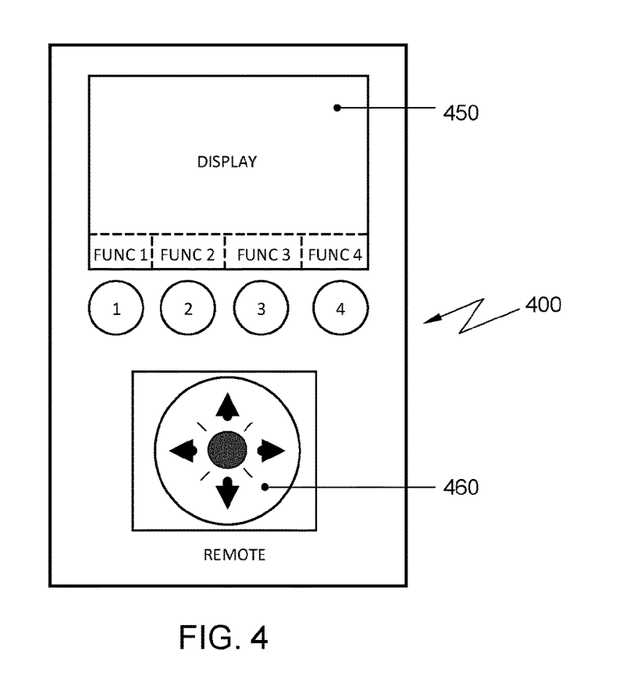
FIG. 4 shows schematic view of a remote input module.

FIG. 4 shows a schematic view of a remote input module 400. This module 400 functions as an input device, comprising a display 450 and input controls 460, to program the controller 40 in teach mode. In this teach mode the laser device 50 can be inclined or declined until the laser beam shines at the desired end of the area (for example an end of a runway) and effectively is positioned in the desired maximum angle in relation to the horizontal axis. By storing this value of the maximum angle in a fixed memory, the maximum angle and therefore the area in which the laser beam can be used to repel birds is defined.

Figure 5:
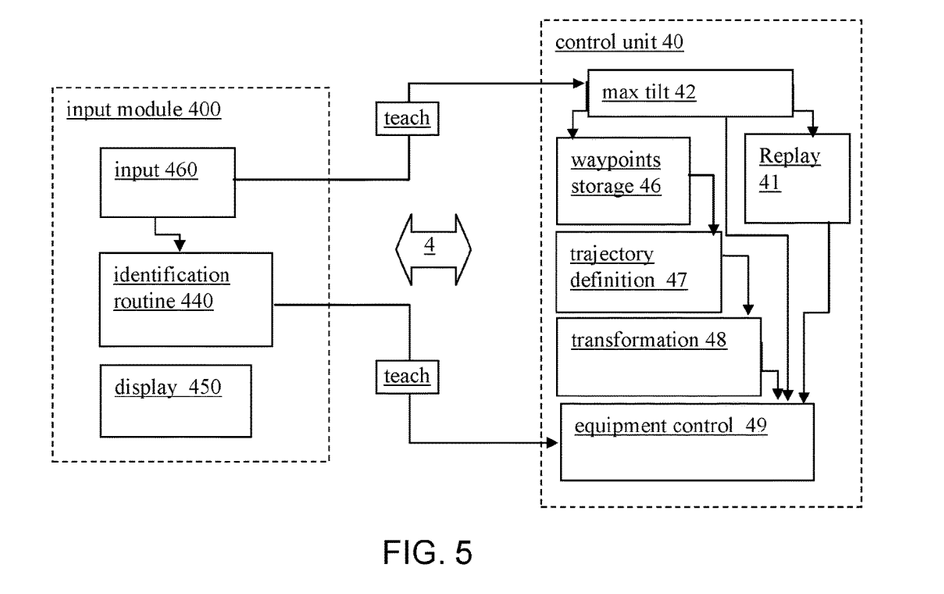
FIG. 5 shows a schematic flow chart illustrating the functions of input module and control unit.

FIG. 5 shows a schematic flow diagram illustrating the interplay between input module 400 and control unit 40 connected wirelessly or via suitable connectivity. For hand held applications, the input module and control unit may be provided in a single device. The input module 400 is programmed, in teach mode, to control the scanning equipment 20 via equipment control 49 by rotating the laser beam at designated lateral and elevational angles input by the input module. The input module further comprises an identification routine 440 to identify said designated lateral and elevational angles as waypoints for said successive waypoints defining the laser scanning area; and to store the waypoints in the control unit 40. To this end, a wireless or wired interface 4 may be provided between input module 400 and control unit 40.

In further detail control unit 40 is programmed with a function 46 to receive and store successive waypoints defining a laser scanning area to be scanned by the laser beam, as will be shown in subsequent figures. A function 47 defines a trajectory bounded between perimeter lines that connect successive waypoints inside the laser scanning area and a function 48 transforms the trajectory in designated elevational and lateral angles of a laser beam to be rotated. Function 49 activates the laser 50 to produce a moving spot along the trajectory for said designated elevational and lateral angles. The control unit 40 to this end comprises a non-transient computer-readable storage medium (not shown) with corresponding program instructions. Furthermore the input module 40 may further comprises a routine 41 for storing and replaying said designated lateral and elevational angles input by the input module. The input module 40 further comprises a routine 42 for defining a maximum elevational and/or max pan (designated lateral) angle; and wherein the control unit 40 is programmed with function 42 to de-activate the laser for elevational and/or max pan (designated lateral) angles larger than the maximum designated elevational and/or max pan (designated lateral) angle.

Figure 6:
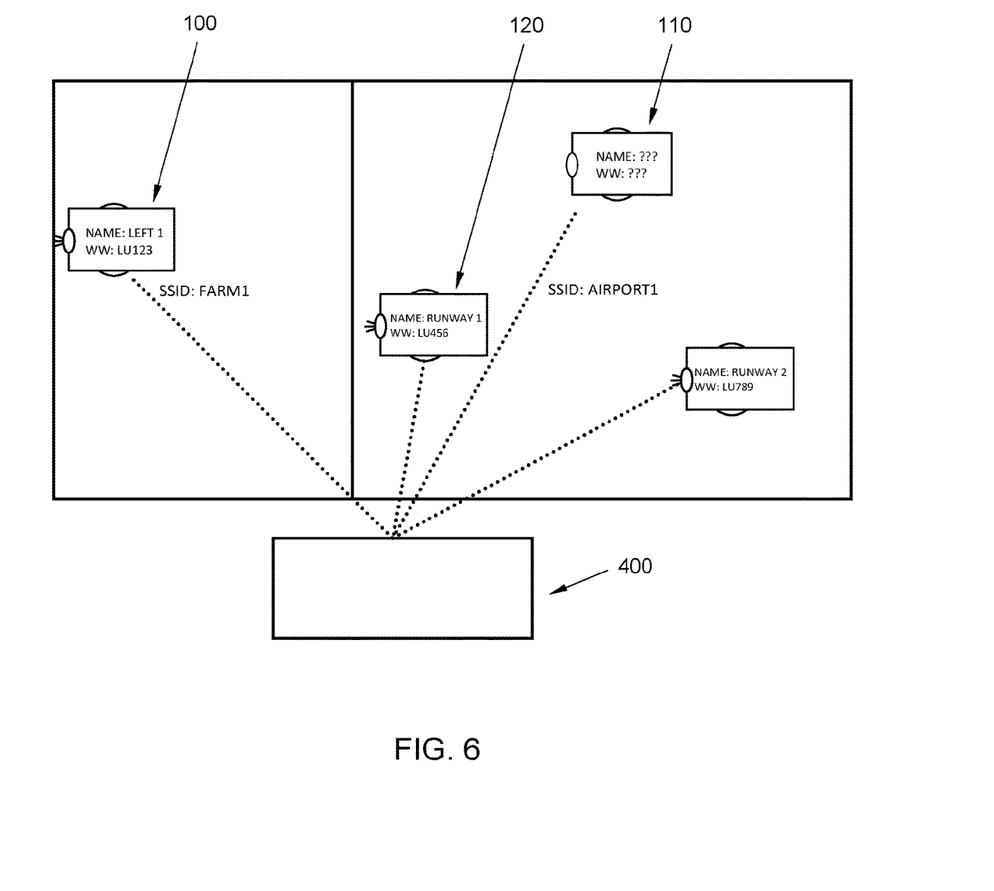
FIG. 6 shows a remote input function for a plurality of areas.

FIG. 6 shows a remote input function for numerous areas, for example in farmland and airport surroundings. These areas may be controlled by a single remote device 400 that communicates with various bird deterrence laser devices 100, 110, 120, each identified by a designated identifier.

Figure 7:
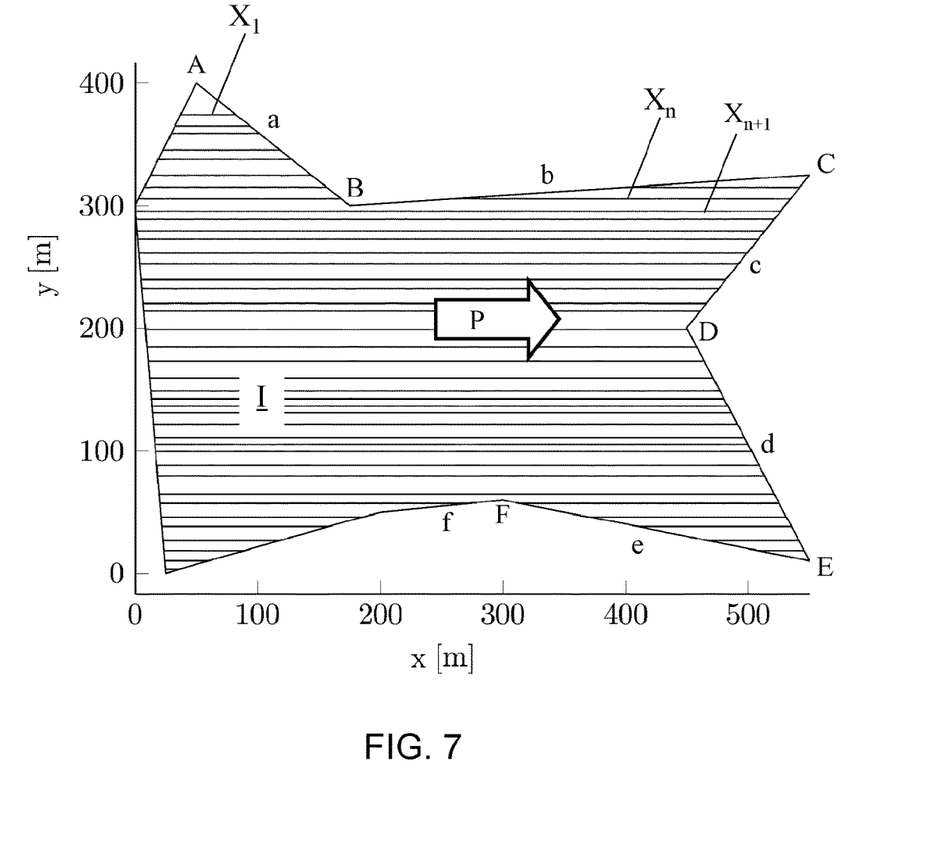
FIG. 7 shows a schematic embodiment of a defined trajectory bounded between perimeter lines of a laser scanning area.

FIG. 7 shows a schematic embodiment of a defined trajectory comprising of lines $X_1, \ldots, X_n$ bounded between perimeter lines (a, b, c, . . . ) of a laser scanning area I connecting successive waypoints (A, B, C, . . . ) inside a polygon area, the trajectory having a principal direction P. This direction may be chosen relative to the x and y dimensions. In the embodiment, the control unit is programmed to define successive trajectories of the laser spot having the same principal directions on the ground. Furthermore, the control unit may be programmed to define successive trajectories of the laser spot having a lateral inter-distance by a random pick in the interval of 5-15 m on the ground. This introduces an irregular erratic movement of the moving laser spot, which enhances the deterrence effectiveness.

The following method may be used to see which perimeter lines (a, b, c, . . . ) are approached in a trajectory line $X_1, \ldots, X_n$ by the moving laser spot.

The trajectory line having principal direction Q may be defined by points p3=(x; y)=(x3; y3) and p4=(x+0:01; y)=(y4; x4).

The laser will cross a perimeter line a, . . . with waypoints A=(x1; y1) and B=(x2; y2), if the intersection coincides with line a. This point can be calculated by $$(P_x, P_y) = \Big(\frac{(x_1 y_2 - y_1 x_2)(x_3 - x_4) - (x_1 - x_2)(x_3 y_4 - y_3 x_4)}{(x_1 - x_2)(y_3 - y_4) - (y_1 - y_2)(x_3 - x_4)}, \quad (1)$$
$$\frac{(x_1 y_2 - y_1 x_2)(y_3 - y_4) - (y_1 - y_2)(x_3 y_4 - y_3 x_4)}{(x_1 - x_2)(y_3 - y_4) - (y_1 - y_2)(x_3 - x_4)}\Big),$$

where perimeter line a is crossed provided Px is within the interval [x1; x2] and Py is within the interval [y1; y2].

Figure 8:
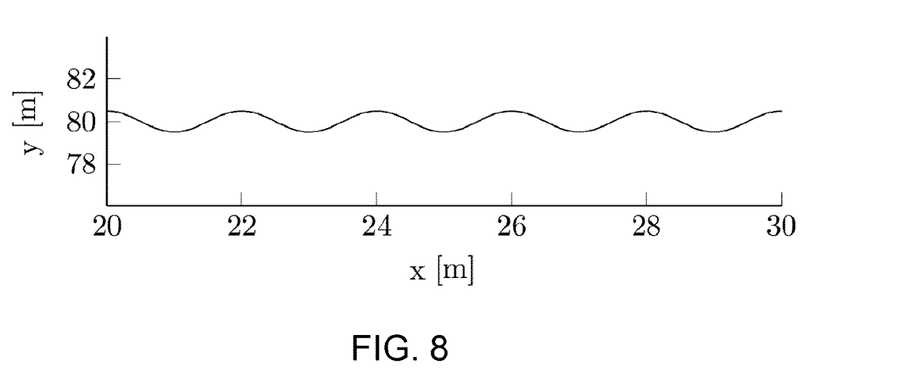
FIG. 8 shows a further schematic embodiment of a defined trajectory.

FIG. 8 shows a further schematic embodiment of a defined trajectory. In this embodiment, a detail is shown of an area to be scanned, parameterized by horizontal and vertical coordinates. In the example, the principal direction of the beam movement is in the horizontal (x) direction. In addition, or alternatively, control unit 40 may be programmed to define a trajectory with reduced angular speed for increasing elevations or lateral angles, so as to produce a relative constant speed of the laser spot on the ground.

According to this embodiment the control unit is programmed to define a trajectory of the laser spot with an lateral spreading on the ground relative to the principal direction. Such spreading may be sinusoidal, but also other types of spreading may be provided, such as block, zigzag or ellipsoid figures, in order to provide a lateral extent from the main direction. In the example, a period of about 1-5 meter on the ground, with an effective amplitude of about 3-30 meter on the ground may be effective.

Finally, the above-discussion is intended to be merely illustrative of the present system and should not be construed as limiting the appended claims to any particular embodiment or group of embodiments. Thus, while the present system has been described in particular detail with reference to specific exemplary embodiments thereof, it should also be appreciated that numerous modifications and alternative embodiments may be devised by those having ordinary skill in the art without departing from the scope of the present systems and methods as said forth in the claims that follow. The specification and drawings are accordingly to be regarded in an illustrative manner and are not intended to limit the scope of the appended claims.

For example, the trajectory of the laser spot defined by the control unit may be formed by circular or ellipsoid movements of the spot shape. The spot shape may furthermore be subject to projection, in dependence of the designated lateral and elevational extent. For example, the spot size may be corrected for larger elevations and lateral extent. For example, the spot intensity may be adjusted for remote projection of the spot.

While in the current application, projection of a laser spot is realised on the ground in laser scanning areas defined by waypoints as presently disclosed, the projection method can also be realised in areas of generic definition, wherein the control unit is programmed to define successive trajectories of the laser spot having the same principal directions on the ground; wherein the control unit is programmed to define successive trajectories of the laser spot having a lateral interdistance by a random pick in an interval on the ground; and/or wherein a control unit is programmed to define a trajectory with reduced angular speed for increasing elevations or lateral angles, so as to produce a relative constant speed of the laser spot on the ground In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. The mere fact that certain measures are recited in mutually different claims does not indicate that a combination of these measures cannot be used to advantage and are deemed explicitly disclosed by the subject application.

The invention claimed is:

1. A bird deterrence system comprising:
    a laser device for producing a laser beam; comprising scanning equipment for rotating the laser beam at designated lateral and elevational angular speeds relative to a normal axis;
    a power supply for feeding the laser device;
    a control unit for controlling the laser device; and
    an input module that is programmed, in a teach mode, to control rotation of the laser beam at designated lateral and elevational angles, wherein the input module further comprises an identification routine to: a) identify said designated lateral and elevational angles as successive waypoints defining a laser scanning area; and b) to store the waypoints in the control unit, and wherein the input module further comprises a routine for defining a maximum elevational angle; and
    wherein the control unit is programmed to de-activate the laser beam for elevational angles larger than the maximum designated elevational angle,
    wherein the control unit is further programmed to execute the steps of:
        receiving successive waypoints defining a laser scanning area to be scanned by the laser beam;
        defining a trajectory bounded between perimeter lines that connect successive waypoints inside the laser scanning area, the trajectory having a principal direction;
        transforming the trajectory in designated elevational and lateral angles of a laser beam to be rotated; and
        activating the laser beam to produce a moving spot along the trajectory for said designated elevational and lateral angles.

2. The system according to claim 1, wherein the input module further comprises a maximum lateral angle routine for defining a maximum lateral angle; and wherein the control unit is programmed to de-activate the laser beam for lateral angles larger than the maximum designated lateral angle.

3. The system according to claim 1, wherein the control unit is programmed to define a trajectory with reduced angular speed for increasing elevations or lateral angles, so as to produce a relative constant speed of the laser spot on the ground.

4. The system according to claim 1, wherein the control unit is programmed to define a trajectory of the laser spot with a lateral spreading on the ground relative to the principal direction.

5. The system according to claim 1, wherein the control unit is programmed to define successive trajectories of the laser spot having the same principal directions on the ground.

6. The system according to claim 1, wherein the control unit is programmed to define successive trajectories of the laser spot having a lateral interdistance by a random pick in an interval on the ground.

7. The system according to claim 1, wherein the input module further comprises a storing an replating routine for storing and replaying said designated lateral and elevational angles input by the input module.

8. The system according to claim 1, wherein the input module is remote from the control unit.

9. The system according to claim 1, wherein the input module controls a plurality of control units of respective laser devices, each identified by a designated identifier.

10. The system according to claim 1, wherein the equipment comprises pan and tilt motors arranged to direct the device in designated lateral and elevational angles; the pan and tilt motors controlled by the control unit; and wherein the laser device is fixed to a frame constructed to be fixed relative to the laser scanning area to be scanned and defining a normal axis; rotating the laser beam at designated lateral and elevational angular speeds relative to the frame.

* * * * *